US005280333A

United States Patent [19]

Wunderer

[11] Patent Number: 5,280,333

[45] Date of Patent: Jan. 18, 1994

[54] APPARATUS AND A METHOD FOR TESTING DOCUMENTS

[75] Inventor: Bernd Wunderer, Munich, Fed. Rep. of Germany

[73] Assignee: GAO. Gesellschaft fuer Automation und Organization mbH, Munich, Fed. Rep. of Germany

[21] Appl. No.: 727,629

[22] Filed: Jul. 10, 1991

[30] Foreign Application Priority Data

Jul. 11, 1990 [DE] Fed. Rep. of Germany ....... 4022020

[51] Int. Cl.[5] ........................ G06K 9/74; G06K 11/08

[52] U.S. Cl. .................................. 356/71; 250/458.1; 250/482.1; 235/491; 356/317

[58] Field of Search ........................ 356/71, 317-318; 250/481, 341, 337, 338.1, 458.1, 556; 209/534; 235/491

[56] References Cited

U.S. PATENT DOCUMENTS 3,463,927 8/1969 Allington ............................ 356/435
3,822,097 7/1974 Allington ............................ 356/435

FOREIGN PATENT DOCUMENTS 2641130 3/1978 Fed. Rep. of Germany ........ 356/71

*Primary Examiner*—Vincent P. McGraw
*Assistant Examiner*—LaCharles P. Keesee
*Attorney, Agent, or Firm*—Townsend and Townsend Khourie and Crew

[57] ABSTRACT

In an apparatus for testing documents, the optical illuminating unit comprises at least one light guide provided with fluorescent substance for directing at least two light fractions of different wavelengths onto a common area of the document. The light fractions are switched on and off by the time-division multiplex method. Special switching regulators are provided for regulating not only the switch-on and switch-off operation of the illumination sources but also the brightness thereof.

19 Claims, 4 Drawing Sheets

APPARATUS AND A METHOD FOR TESTING DOCUMENTS

BACKGROUND OF THE INVENTION

The present invention relates to a means and a method for testing documents comprising a drive unit and a scanning means for taking up the light diffusely reflected by the document and/or transmitted through the document.

At central agencies such as commercial banks and state banks, bank notes are now counted, tested and sorted almost solely using fully automatic sorting and testing devices. These machines detect or test the bank notes with reference to various criteria. Preferred test criteria are the size, thickness and printed pattern of the notes. The measurements of the printed pattern are usually taken by electrooptical methods, whereby the bank note is scanned with electrooptical sensors over the entire surface or in predetermined surface areas. The resulting measured signals are compared with predetermined acceptance ranges either directly or after signal processing. The result of comparison is customarily used together with the results of other measurements to judge the bank note.

Process tolerances, soiling, wear of the bank notes and other effects lead to a wide scattering of the measured values and consequently to wide acceptance ranges even in the case of quite valid notes. Wide acceptance ranges increase the probability of misjudgements. On the other hand, automatic sorting and testing devices, particularly in the paper-of-value branch, must have a high degree of reliability, especially when it comes to the detection of denominations and the sorting out of invalid and unfit bank notes. Increasingly sophisticated methods of measurement are therefore used in the machines.

Swiss patent no. 476 356 describes an apparatus for testing bank notes optically also in terms of their characteristic color nuances. For testing, the bank note is illuminated in a limited surface area with light from a wide-band light source. The reflected light is separated into various wave ranges in an optical dispersing system, for example a glass prism. The color brightness present in the various wave ranges is recorded by several, associated photoelectric detectors. The measured signals are evaluated in threshold levels so that an OK signal is provided if the measured values agree with the ranges of tolerance.

However, the proposed assembly can only be used for automatic bank note sorting and testing devices with large restrictions which are currently no longer tolerable. Modern automatic sorting and testing devices are characterized by a high processing capacity and transport the bank notes at speeds of several meters per second. This results in short dwell times of the bank notes in the sensor area; the luminosity factor attainable within this time is usually in the vicinity of the lower range of tolerance without color testing. Due to the spectral splitting of the light into several wave ranges each individual sensor has very little light intensity available; the resulting high signal-to-noise ratio occasionally reduces the obtainable reliability rate to such an extent that the advantages of testing for color nuances disappear completely.

German "offenlegungsschrift" no. 38 15 375 describes an apparatus for testing the authenticity of documents with reference to the color. The apparatus is composed of several similar modules. Each module comprises an illuminating system of light guides and a photosensor. Special optical components such as color filters ensure that each module is sensitive only in a preselected spectral range. For color testing, the document is directed past the modules, whereby the photosensors of the modules scan the document line-by-line in various predetermined spectral ranges, passing the measured values on to the evaluating means.

Since a separate module is provided for each spectral range the modules must be made available with all necessary components several times over, which considerably increases not only the size but also the price of the machines, in particular when expensive fiber bundles are used as the light guides, as proposed in the German print. The use of filters for spectrally separating the light fractions not only increases the costs of the testing device but also diminishes the efficiency between the luminous power available on the measuring surface and the irradiated luminous power.

The present invention based on the problem of proposing an apparatus and a corresponding method for optical testing of documents in at least two spectral ranges, whereby the aforesaid disadvantages are avoided.

According to the invention by the features of the independent claims.

SUMMARY OF THE INVENTION

An essential feature of the inventive solution is that the document is illuminated with light of different spectral ranges using a light guide provided with fluorescent substance that is simultaneously utilized as a light guide for other radiation sources. Light guides provided with fluorescent substance, for example so-called fluorescent plates, have been known for some time. They are made of a transparent plastic with fluorescent colorant molecules embedded therein. Light acting on the plate is absorbed by the molecules and generally emitted again as longer-wave light. The light emitted in the plate in all directions in space is collected to a large degree in the plate via total reflections and exits at the edges of the plate as fluorescent light with high intensity. Fluorescent plates can be used to illuminate a document in a very simple way with light of a first spectral range with high intensity and a very homogeneous distribution. For the light of a further spectral range the fluorescent plate serves according to the invention only as a light guide. The light of this second spectral source is coupled in via one of the edges or narrow sides of the plate and exits at another edge via total reflections in the plate. Light-emitting diodes are preferably used for this light of a certain spectral range. For constructional reasons, light-emitting diodes emit their light in a limited solid angle range, so that light can be coupled effectively into light guides. However, the light of the second spectral source can also be produced by a second fluorescent plate that is coupled optically to the plate producing the first light.

The inventive solution makes it possible to direct light of different spectral ranges with high intensity and a homogeneous distribution onto a common measuring point of the document with relatively little constructional effort, i.e. particularly without the use of filter elements, and to evaluate it using only one detector. Due to the use of a light guide the illumination geometry can be varied in manifold ways. The use of a platelike light guide permits a homogeneous slit-shaped illumination of the paper of value. The light exiting from the edge of the plate in the form of a lobe can be used directly to illuminate the test object. However, it is also possible to adjust the desired illumination geometry by shaping the exit edge accordingly, imaging the exit edge on the test object or superposing several light lobes from several exit surfaces of one or more fluorescent plates.

The illumination of a surface area of the document with light of different spectral ranges necessitates, if no filter assemblies are to be used, a different kind of separation of the light fractions to permit selective analysis in the spectral ranges used.

According to a development of the invention it is therefore proposed that the different spectral sources whose light fractions are directed to the measuring point directly or indirectly via a common light guide be modulated in such a way as to illuminate the measuring range only in one spectral range at a time. The spectral sources are therefore switched on and off alternatingly by time-division multiplexing, the switching frequency being set high enough for a sufficient number of measured values to be recorded during the pass of a document.

A fast clocking depends on accordingly short rise and decay times of the radiation sources themselves. One therefore uses light-emitting diodes whose light reaches the measuring point directly via the light guide, on the one hand, and fluorescent lamps whose light is used for exciting the fluorescent emission, on the other hand. Fluorescent lamps have a high luminosity factor with small heat emission and are therefore especially suitable for producing fluorescent light.

Special switching regulators are provided according to the invention both for the light-emitting diodes and for the fluorescent tubes, to permit not only fast clocking of the radiation sources but also a low-loss automatic brightness control.

Further advantages and developments of the invention can be found in the subclaims and in the subsequent description of embodiment examples with reference to the figures.

BRIEF DESCRIPTION OF THE DRAWINGS

FIG. 2 shows an assembly with two curved fluorescent plates.

DESCRIPTION OF THE PREFERRED EMBODIMENTS

Figure 1:
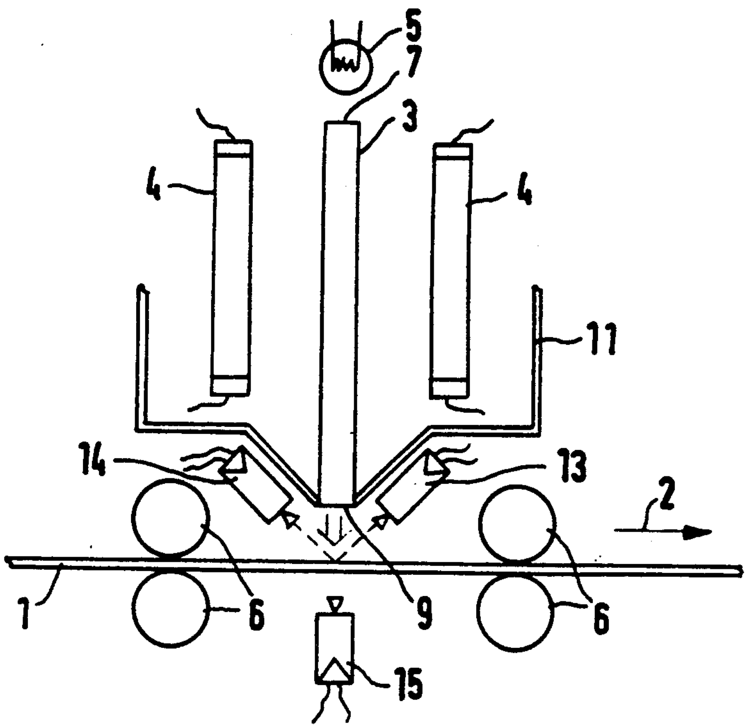
FIGS. 1, 2 show schematic views of a sensor on the basis of a fluorescent plate.

FIG. 1 shows a first embodiment example of a highly schematized assembly of the inventive means for testing papers of value, for example bank notes, with the aid of two spectral sources and a fluorescent plate.

A bank note 1 is directed by means of a transport system 6 in the direction of arrow 2 past the sensor assembly. The illuminating portion of the sensor comprises a fluorescent plate 3, two fluorescent tubes 4 and a further illuminating means 5, for example light-emitting diodes. Plate 3 is made of a plastic material in which a fluorescent colorant is distributed homogeneously. Such plates are commercially available. Fluorescent tubes 4 disposed beside the plate illuminate the surface of the plate with light of a short wavelength. The light penetrates the plate and is absorbed by the colorant; a large part of the absorbed energy is emitted again as fluorescent light at a longer wavelength than that absorbed. The spectrum of the fluorescent light is typically a band about 100 nanometers wide; depending on the colorant the effective wavelength in the currently available plates is within a range from blue to far red. Due to total reflection within the plate the fluorescent light exits mainly on the narrow sides or edges of the plate. To minimize the losses of light, the edges of the plate not required as entrance or exit edges for the light are metal-coated. For high efficiency one should coordinate the spectra of the fluorescent lamps and the fluorescent plate. Fluorescent lamps with an emission in the blue spectral range are suitable for green- to red-emitting fluorescent plates, while a lamp radiating in the ultraviolet range is preferable for blue-emitting plates.

Fluorescent plate 3 simultaneously serves according to the invention as a light guide for second illuminating means 5. To couple in the light effectively it is disposed directly above entrance edge 7 of the plate, optionally via optical coupling media. The light of the light-emitting diodes used here by way of example penetrates the plate and is directed to the exit edge by total reflection on the base and top surface. To avoid losses, the wavelength of the diodes should be selected so that it does not fall within an absorption band of the fluorescent plate.

The light of the two spectral sources leaves the plate on exit edge 9 and causes homogeneous illumination of a stripe-shaped surface at high luminance in accordance with the geometry of the exit surface.

The light diffusely reflected or transmitted by the bank note can be detected by several detectors 13, 14, 15. One preferably uses linear detectors, such as a CCD array. The signals from the detectors can be evaluated alone or in an appropriate combination. When disposing the components one must generally make sure shielding means 11 are provided at suitable places to prevent scattered light or outside light from hitting the detectors. If color separations are to be evaluated, illumination sources 4 and 5 are operated in time-division multiplexing, i.e. they are switched bright and dark in an alternating rhythm. The detectors are read out in-phase with the alternating rhythm; the resulting measuring signal therefore obtains the two color separations in an alternating sequence so that they can be stored and/or processed separately.

Figure 2:
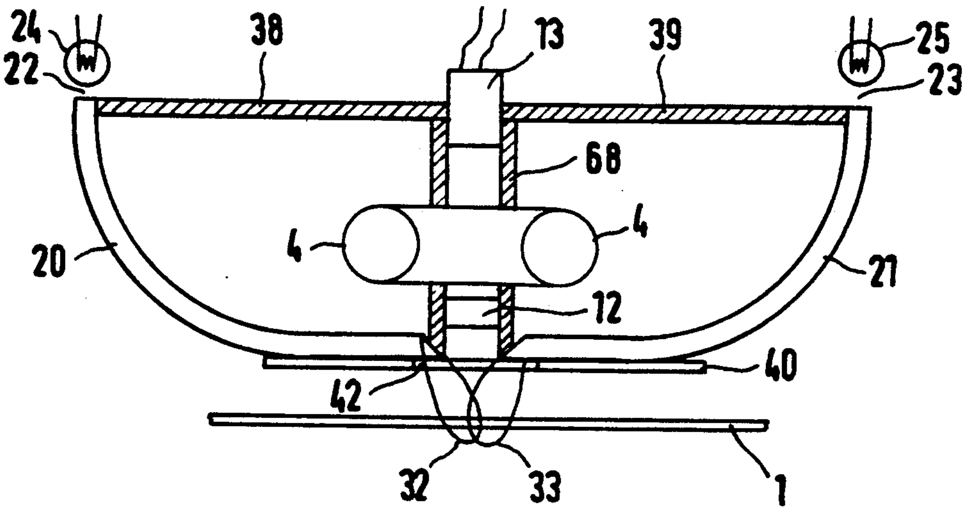

FIG. 2 shows an embodiment of the inventive means that has two symmetrically disposed fluorescent plates 20, 21 to achieve a homogeneous illumination of the measuring surface. To obtain a compact sensor, plates 20, 21 are disposed in an arched shape about illuminating means 4. As long as the bending radius is clearly greater than the plate thickness the losses of light due to an exit of light on the surfaces of the plate are negligible. The light of the illuminating means is coupled in as in FIG. 1. Light-emitting diodes 24, 25 are disposed on narrow sides 22, 23 of the plate; fluorescent source 4 illuminates the surfaces of fluorescent plates 20, 21. The insides of supporting structures 38 and 39 are metal-coated; this causes the light of fluorescent source 4 radiated in all directions in space to be reflected onto the fluorescent plates. In the embodiment shown, a U-shaped fluorescent lamp can preferably be used, observation being possible through the slit in the lamp. A suitable lamp for this purpose is, for example, Osram's Dulux-S lamp.

To couple out the light the two exit edges of fluorescent plates 20, 21 are sloped and possibly metal-coated. The slopes couple the light beams out of the plates at a certain angle, directing it onto the desired area of bank note 1. The angle of the slopes can be selected such that exit lobes 32 and 33 from the fluorescent plates overlap to a greater or lesser degree on the bank note.

Detector 13 is disposed in a shaft 68 between the two illuminating portions, being thus well protected from scattered light. An imaging system 12 disposed in the shaft can be used to image the desired illuminated area of bank note 1 on detector 13. A cover 40 with a window 42 is mounted between the transport path of the bank notes and the sensor assembly to provide protection from soiling and damage. To separate the color components, the spectral sources and the detector are driven in the time-division multiplex mode, as already described in FIG. 1.

The shown arrangement can in principle also be used for measurement in three or four spectral ranges. If one of the two rows of light-emitting diodes 24, 25 is replaced by a type emitting in a different wavelength, for example, three spectral colors are available at the measuring point. A fourth color can be added by using differently emitting fluorescent molecules in plates 20 and 21.

Figure 3:
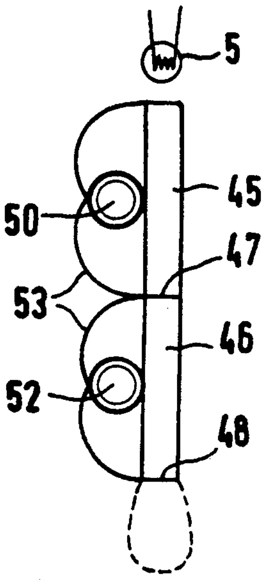
FIG. 3 shows an assembly for measurement in three spectral ranges.

FIG. 3 shows an alternative assembly for producing three or more spectral colors at the measuring point. In this case two fluorescent plates 45 and 46 provided with different fluorescent substances are interconnected by their narrow sides or edges 49. The surfaces of the edges and the connection thereof are such that the light can pass without hindrance. Plates 45 and 46 are illuminated by fluorescent lamps 50 and 52. To increase the efficiency the two lamps are surrounded with suitably formed reflectors 53. The fluorescent substances of the plates and the particular excitation light are selected such that the emitted light of a plate passes the following plate in the direction of the bank notes with as little loss as possible. As already described in earlier embodiment examples, plates 45, 46 serve additionally as light guides for a further illuminating means 48.

As shown by the embodiment examples above, a further advantage of the invention is the multiplicity of possibilities for combining the individual components and varying the spectral ranges and illumination geometries. The sensor can thus be adapted optimally to the measuring requirements. For transmission measurements it is usually sufficient to employ the exit edge of the fluorescent plate directly as a light source, as shown in FIG. 1. One must make sure the brightness decreases monotonically with the distance of the measuring surface. However, a maximum brightness at a predetermined distance from the sensor can be obtained by superposing several exit lobes or by optically imaging the exit surface. FIG. 2 has already shown a first example of the principle of superposition, the zone of maximum brightness being some distance away from the exit edges of the fluorescent plates. In the superposed area, changes of distance between the test object and the illumination source have less influence on changes in brightness.

Figure 4:
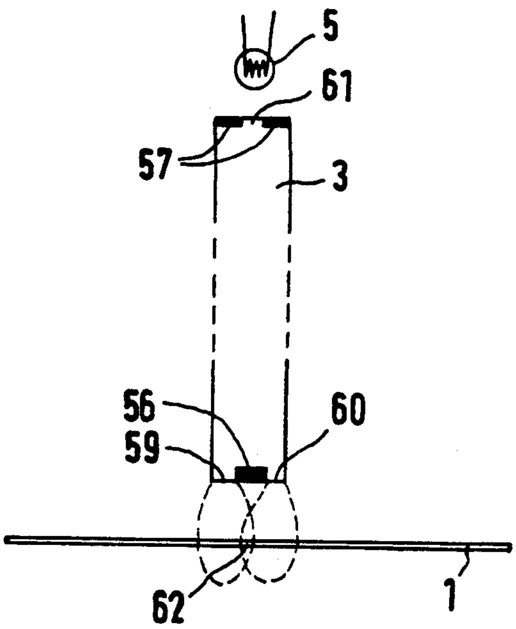
FIGS. 4, 5 show special embodiments of the exit edge.

FIG. 4 shows a further embodiment example for the principle of superposition. The exit edge of fluorescent plate 3 has in this case been provided with a metal coating 56 in its central portion over its total length. This measure shifts the maximum intensity away from the exit surface. The reduction of absolute brightness in measuring surface 62 due to the partial metal coating can be compensated by measures on the entrance edge. A metal coating 57 on the entrance edge gives the reflected light another possibility of reaching one of exit windows 59, 60. If the entrance edge is metal-coated, however, one must ensure permeability for the light from a light source 5, which can be done for example by providing a wavelength-selective metal coating for the fluorescent light or a corresponding window 61.

Figure 5:
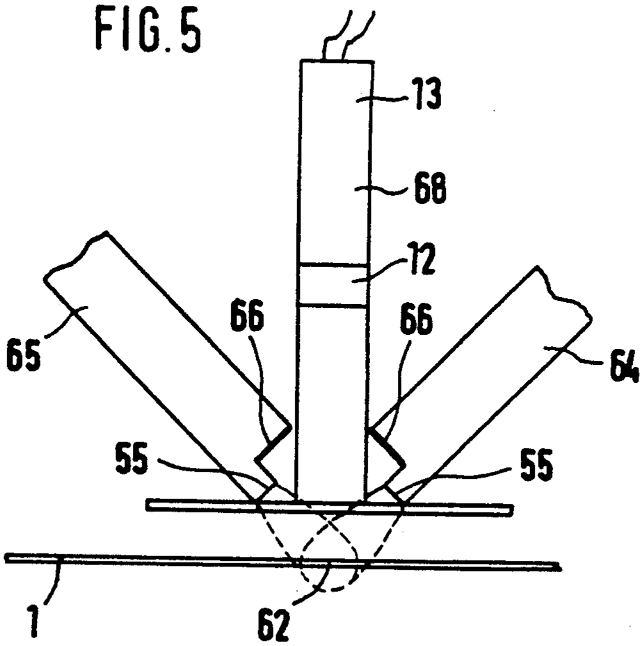

FIG. 5 shows a further embodiment example for the principle of superposition. An area 62 of optimal brightness is produced at a predetermined distance, at the same time largely avoiding scattered light in the detector. Fluorescent plates 64 and 65 are in this case disposed at 45° to the measuring surface, so that exit surfaces 55 on the two plates point to a common surface area. Between the two plates there is detector shaft 68 in which an imaging system 12 and a linear detector 13 are disposed in the known way. A partial metal coating 66 of the exit edges in conjunction with the symmetrical arrangement shifts zone 62 of maximum brightness away from the sensor into an area that is passed by document 1. The illuminating means, which are not shown in detail here, can be selected as shown for example in FIG. 2.

High-quality brightness concentrations are obtained by optical imaging of the exit edge. It must first be noted that an image of the exit edge can be produced in the measuring surface using basically any spherical or cylindrical imaging system. Due to the lack of space within a sensor module and the special illumination and observation requirements it is preferable to use compact optics that fulfill several optical functions at the same time, for example deflecting and focusing light beams simultaneously.

Figure 6:
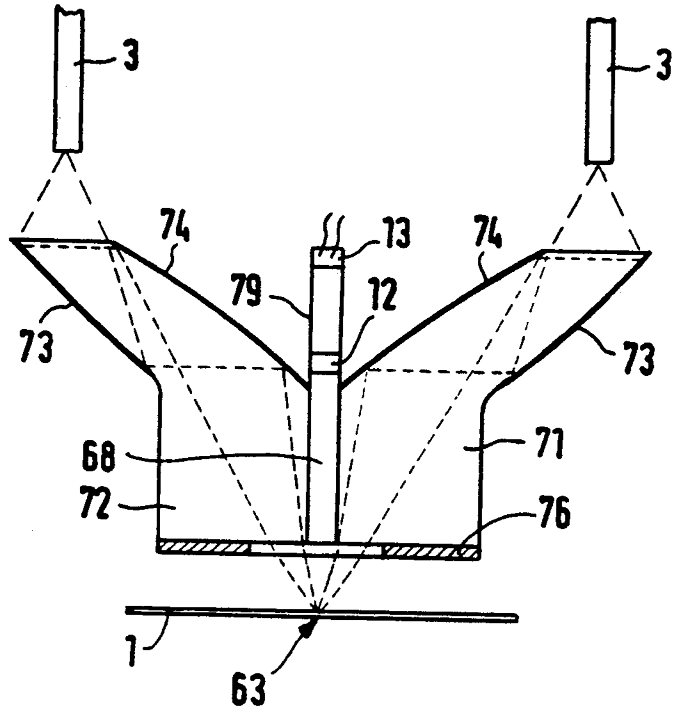
FIG. 6 shows an optical system for focusing the exit lobe on the measuring surface

FIG. 6 shows a cross section through a symmetrically constructed sensor module, the light of fluorescent plates 3 being projected onto the measuring surface by an imaging deviating system. The color components of the light are produced in the way described above and directed to the exit edges of fluorescent plates 3. After leaving the plate the light hits imaging deviating system 71. The deflection and imaging are effected by reflection of the light beams on metal-coated surfaces 73 and 74. The beam path for the marginal rays of the exit lobe is shown by dash lines. The light first penetrates glass body 71 and is reflected on metal-coated surface 73; surface 73 is a piece of a parabolic surface shaped in such a way that the light is reflected to surface 74 as a bundle of parallel rays. Surface 74, which likewise has the form of a parabolic surface, focuses the light onto measuring surface 63. To protect the glass body from damage and soiling a protective layer 76 with a window is inserted into the beam path. The focal point is shifted laterally due to the position of the parabolic surfaces with respect to the glass body, and is located precisely below detector shaft 68. A second deviating system 72 is disposed symmetrically to the detector shaft in mirror-inverted fashion; it ensures homogeneous and largely distance-independent illumination in the measuring surface. The scanning of passing bank note 1 in the measuring surface is performed with the aid of an imaging system 12 and a linear detector 13. Walls 79 of the detector shaft are opaque and protect the sensor from scattered light.

The total optical structure of the sensor module can be of extremely compact design; the uncritical positioning of the optical components is advantageous for assemblage. An additional positive property of the sensor structure is that the components are fully free from adjustment during virtually the entire life of the spectral sources, since adjusting means are not necessary; this ensures good reproducibility of the measuring results.

Like the optical system, the spectral sources must also ensure constant measuring conditions over long periods, which means, among other things, that they must be stabilized in their brightness over time. An additional requirement is that the spectral sources must be adapted to be switched on and off in an alternating rhythm so that color separations of the bank notes can be obtained by time-division multiplexing, for example. In order to meet these demands, special switching regulators are proposed according to a development of the invention to drive the spectral sources. These switching regulators control their performance virtually only by briefly switching the power supply on and off. Since switch-on and switch-off operations can be performed virtually without losses these switching regulators convert the electric power optimally into luminous power. Capacitive and inductive components in the circuit of the spectral sources ensure a largely continuous power flow and light flux during the switch-on phase.

Figure 7:
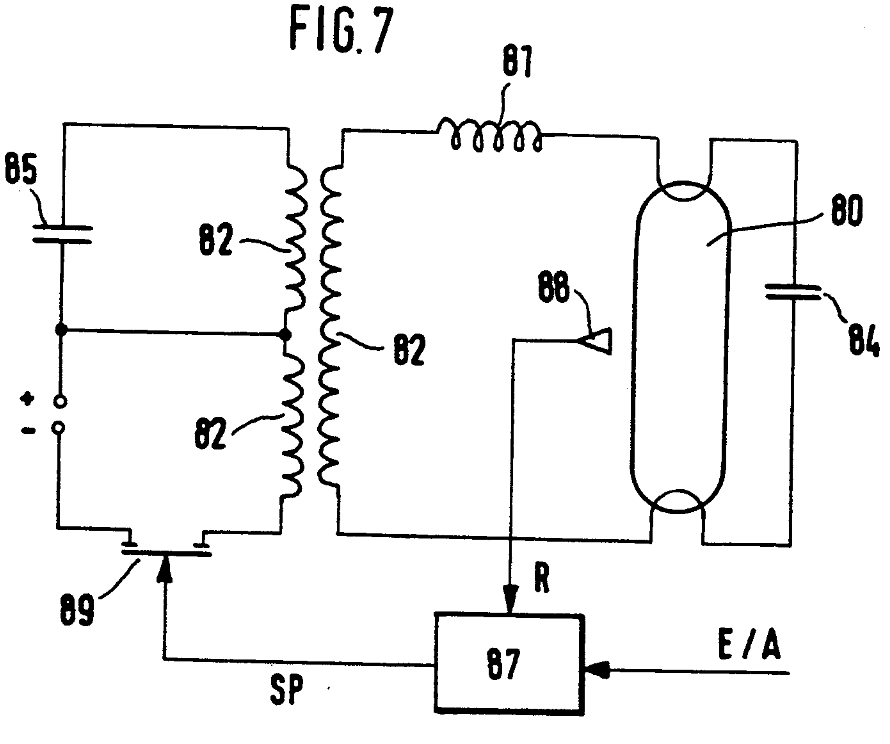
FIG. 7 shows a switching principle for clocked operation of fluorescent tubes.

FIG. 7 shows an embodiment example of a switching regulator for brightness-controlled operation of a fluorescent lamp. Lamp 80 is in series with an inductive resistor 81 on the secondary side of a transformer 82. A capacitor 84 is connected in series with the directly heatable electrodes. Components 81 and 84 form a series resonant circuit. The electric discharge of the lamp takes place parallel to the capacitor. A further resonant circuit is formed by the primary winding of transformer 82 with capacitor 85. A regulator circuit 87 controls the current flow on the primary side via a switching transistor 89 with a frequency and pulse shape such that a given brightness is kept constant at minimal power consumption. The instantaneous brightness is detected by a photoelectric detector 88 and passed on to regulator 87 as a regulation signal. By varying the frequency of control pulses SP one can regulate the brightness of the fluorescent lamp. With the aid of a further signal E/A acting on the regulator, the control pulse sequences, and thus also the lamp, are switched on and off. It has been shown that the circuit also works perfectly when the control pulses are supplied in synchronism with the E/A signal in so-called "bursts," which is what ultimately makes the multiplex mode with other radiation sources possible.

Figure 8:
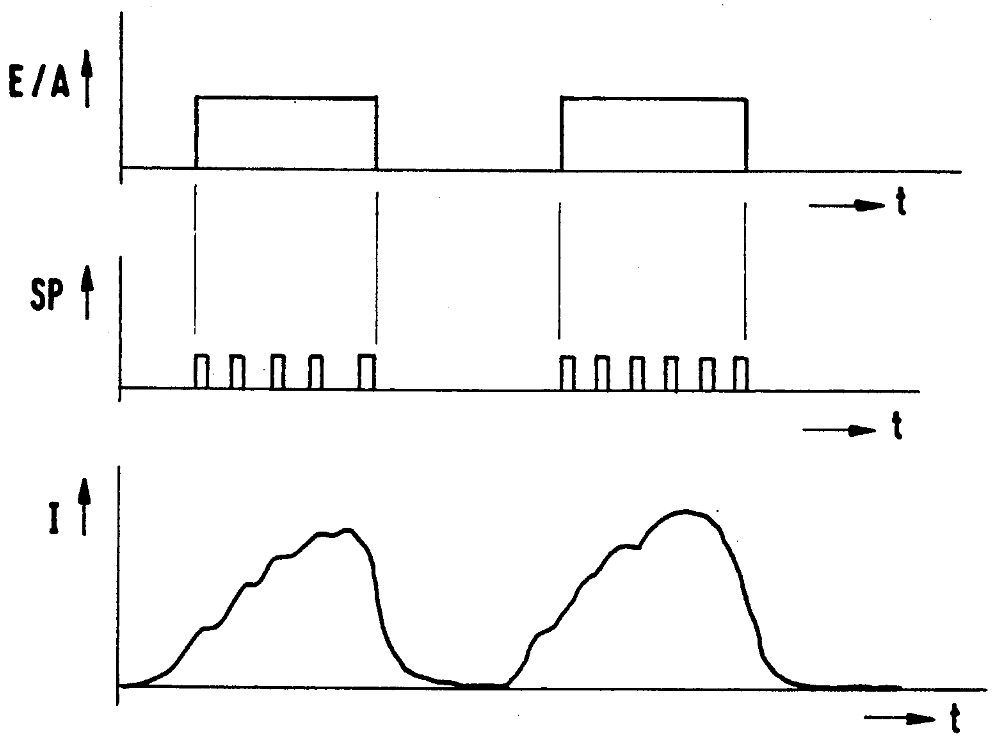
FIG. 8 shows a flow chart of the clocked drive of the fluorescent tubes.

FIG. 8 shows the interaction in time of the E/A signal with control pulses SP of the regulator circuit and intensity I of the fluorescent lamp. The E/A signal determines the switch-on or switch-off phases of the fluorescent lamp. A sequence of switching pulses SP is produced upon each positive E/A signal. Depending on the signal from a brightness sensor the frequency of the switching pulses is regulated in such a way that the power supply to the lamp is increased, for example, when the brightness decreases due to an increase in frequency. The inductive and capacitive components of the circuit smooth the power flow to the lamp and ensure a largely constant brightness throughout the switch-on period. In bank note machines that transport the bank notes at speeds of several meters per second, the frequency of the E/A signal is in the order of about ten kilohertz. To make the brightness controllable the frequency of the control pulses is preferably selected to be higher by a factor of ten.

The light-emitting diodes must also be switched on and off periodically in opposite phase to the fluorescent lamp, a brightness control likewise being necessary.

Figure 9:
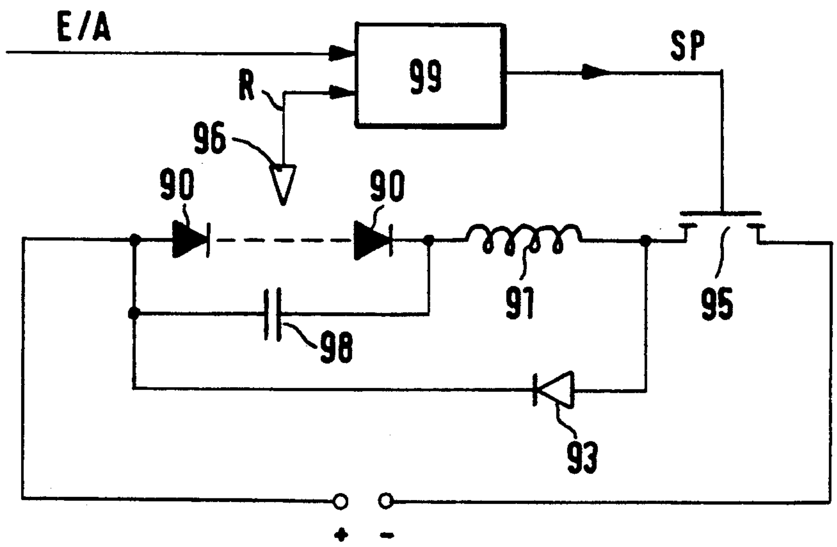
FIG. 9 shows a basic circuit diagram for clocked operation of light-emitting diodes.

A basic circuit diagram for a switching regulator adapted to the characteristic of the light-emitting diodes is shown in FIG. 9. Light-emitting diodes 90 are connected in series and are thus operated with a power supply. Since the light emission of light-emitting diodes increases approximately linearly with the passing current it can be regulated via pulse width modulation of the current. For this purpose a switching transistor 95 driven by a pulse width modulator 99 is provided in series with the light-emitting diodes. A sensor 96 which takes up the brightness of the diodes supplies its signal to the pulse width modulator. Depending on the signal level of this sensor the pulse width of the switching pulses in changed in such a way that its constant brightness is ensured. To smooth the peak currents and voltages during the switch-on period of the control pulses, the inductive resistor 91 is connected in series with the light-emitting diodes. This resistor limits the increase of current of switching transistor 95 during the switch-on. The energy stored in the coil is supplied to diodes 90 via recovery diode 93 after the switch-off of the switching transistor, thereby maintaining the current flow even in the switch-off pauses of the transistor. The same purpose is also served by capacitor 98 in parallel with the light-emitting diodes. To maintain a range of adjustment it is also necessary here to increase the switching frequency by at least a factor of ten over the machine cycle.

Along with the lossfree brightness control of the spectral sources, the circuits shown in FIGS. 7 and 9 have the further advantage that the supply voltage can fluctuate within wide limits without impairing the reproducibility of the measured signals.

I claim:

1. An apparatus for testing documents having an optical means for illuminating the document in at least one spectral range and a means for taking up the light diffusely reflected by the document and/or transmitted through the document, the apparatus comprising:

a light guide including a fluorescent substance for directing first and second light fractions having different spectral ranges onto a common area of the document, the light guide having an excitation band, the first light fraction being fluorescent light which arises by excitation of the light guide from a light source directed onto the light guide having a spectral range in the excitation band, and the second light fraction being from a further light source guided through the light guide, the further light source having a further spectral range outside the excitation band.

2. The apparatus of claim 1, wherein the light guide is a plastic plate having flat or curved surfaces and narrow edges, and the first light fraction is the fluorescent light which arises by excitation of radiation from a light source directed onto at least one of the surfaces and which exits at an exit edge of the plastic plate facing the document.

3. The apparatus of claim 2, wherein the second light fraction enters via an edge opposite the exit edge and exits at the exit edge facing the document.

4. The apparatus of claim 2, wherein the second light fraction is the fluorescent light of a further light guide which is coupled optically to a first light guide.

5. The apparatus of claim 2, wherein the second light fraction comprises the light of at least one light-emitting diode.

6. The apparatus of claim 2, wherein the exit edge of the light guide is provided with certain optically reflective areas to influence the form of an exit light lobe.

7. The apparatus of claim 2, further comprising an optical unit provided between the exit edge of the light guide and the document for imaging the exit edge of the light guide on the document.

8. The apparatus of claim 1, wherein the light source and the further light source are connected with switching regulators that regulate both the switch-on and switch-off phases of the light sources and the brightness thereof.

9. An apparatus for testing documents having an optical means for illuminating the document in at least one spectral range and a means for taking up the light diffusely reflected by the document and/or transmitted through the document, comprising:

- first and second light guides each including a fluorescent substance for directing at least two light fractions having differing spectral ranges onto a common area of the document;
- whereby the at least two fractions are fluorescent light which arise by excitation of radiation from first and second sources directed onto the at least two light guides.

10. A method for testing documents which are illuminated with light of different spectral ranges and scanned to take up the light diffusely reflected and/or transmitted by the document, comprising the step of: directing first and second light fractions having first and second spectral ranges, respectively, onto a common area of the document via at least one light guide including a fluorescent substance, the at least one light guide having an excitation band, the first light fraction being fluorescent light, which arises by excitation of radiation from a light source directed onto the at least one light guide and the second light fraction being light from at least one further light source guided through the at least one light guide, the light source and at least one further light source being switched on and off by a time-division multiplex method.

11. The method of claim 10, wherein the directing step is carried out with the light source having a spectral range within the excitation band of the at least one light guide.

12. The method of claim 10, wherein the light from the further light source is produced using light-emitting diodes connected with a switching regulator which produces pulse width modulated control signals in synchronism with the switch-on and switch-off operation of the light-emitting diodes, the further light source having a second spectral range being outside the excitation band.

13. A method for testing documents which are illuminated with light of different spectral ranges and scanned to take up the light diffusely reflected and/or transmitted by the document, comprising the step of: directing light fractions of different spectral ranges onto a common area of the document via at least two light guides each including a fluorescent substance, the light fractions of the different spectral ranges being switched on and off by a time-division multiplex method, whereby both fractions are fluorescent light which arise by excitation of radiation from at least two light sources directed onto the at least two light guides.

14. An apparatus for testing documents by observing light directed onto the documents, the apparatus comprising:

- a light guide including a fluorescent substance and an edge positioned to direct light onto the document, the light guide having an excitation band;
- first and second light sources for directing light onto the light guide so that the light exits the body at said edge, the first light source emitting light of a spectral range within the excitation band which excites the fluorescent substance so that a first light fraction emitted at the edge of the body is of the wavelength of light emitted by the fluorescent substance when excited, and the second light source emitting light having a second spectral range outside the excitation band, the light from the second light source being guided through the body and exiting the body at said edge.

15. Apparatus according to claim 14 wherein the light guide includes two spaced apart outer surfaces, and the first light source directs light against one of the outer surfaces and the second light source directs light onto another edge of the body.

16. A method of testing document by observing light directed onto the document, the method comprising the steps of:

- forming a light transmissive light guide including a fluorescent substance;
- positioning the light guide relative to the document so that light directed against the light guide reaches the document;
- directing a first light having a wavelength selected to excite the fluorescent substance against the body so that light emitted by the excited fluorescent substance reaches the document; and
- directing light of another spectral range against the light guide so that light of such other spectral range reaches the document.

17. An apparatus for testing a document having an optical means for illuminating the document in at least one spectral range and a means for taking up the light diffusely reflected by the document and/or transmitted through the document, comprising:

- at least one light guide including a fluorescent substance for directing first and second light fractions of different spectral ranges onto a common area of the document, the first light fraction being fluorescent light which arises by excitation of the light guide from a light source directed onto the light guide, and the second light fraction being from a further light source guided through the light guide, the wavelength of at least one light fraction being the wavelength of light emitted by the fluorescent substance when excited; and
- a further light guide, the light guide and the further light guide being oriented at an angle of about 45° based on the normal of the document and positioned relative to the document such that the document is located in the superposed area of emitted lobes.

18. A method for testing documents which are illuminated with light of different spectral ranges and scanned to take up the light diffusely reflected and/or transmitted by the document, comprising the steps of:

providing at least one light guide including a fluorescent substance, the light guide having an excitation band;

directing first and second light fractions having first and second spectral ranges, respectively, onto a common area of the document via the at least one light guide, the first light fraction being fluorescent light which arises by excitation of radiation from a light source directed onto the light guide, the second light fraction being the light from at least one further light source guided through the light guide, the light source having a spectral range within the excitation band of the light guide and comprising a fluorescent lamp;

connecting the light source and the at least one further light source to a time-division multiplex apparatus, the light source and the at least one further light source being turned on and off by the time-division multiplex apparatus; and connecting the fluorescent lamp to a switching regulator which produces control pulse sequences (bursts) dependent on the brightness of the fluorescent lamp in synchronism with the switch-on and switch-off operation of said fluorescent lamp.

19. An apparatus for testing documents by observing light directed onto the documents, the apparatus comprising:

a light guide including relatively large, opposing and spaced apart outer surfaces and an edge between the surfaces positioned to direct light onto the document;

first and second light sources for directing light onto the light guide so that the light exits the body at said edge, the light guide including a fluorescent substance, the first light source emitting light of a wavelength which excites the fluorescent substance so that at least one light fraction emitted at the edge of the body is of the wavelength of light emitted by the fluorescent substance when excited, the first and second light sources emitting light of differing wavelengths.

* * * * *